March 16, 1943.  D. A. BRENNAN  2,314,121
FILING EQUIPMENT
Original Filed Nov. 20, 1940
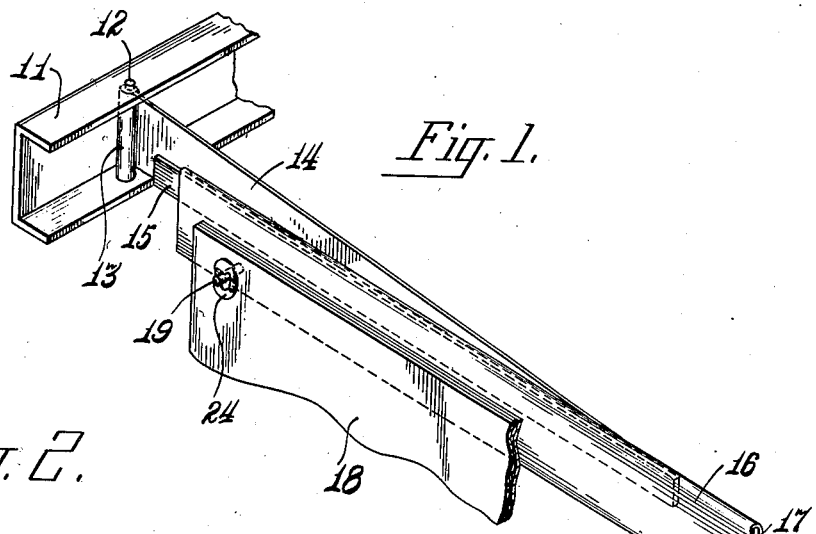
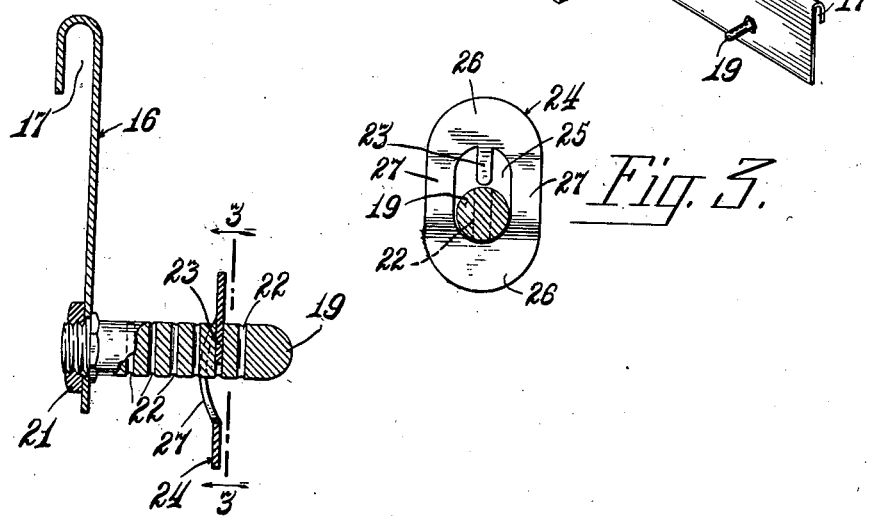
INVENTOR
DANIEL A. BRENNAN
DECEASED
BY Elmer L. Quickel
EXECUTOR Patented Mar. 16, 1943

2,314,121

UNITED STATES PATENT OFFICE 2,314,121

FILING EQUIPMENT

Daniel A. Brennan, deceased, late of Chicago, Ill., by Elmer L. Zwickel, executor, Chicago, Ill., assignor to Acco Products, Inc., Long Island City, N. Y., a corporation of New York Original application November 20, 1940, Serial No. 366,448. Divided and this application September 18, 1941, Serial No. 411,344

3 Claims. (Cl. 129—4)

This is a division carved out of application Serial No. 366,448, filed November 20, 1940.

The invention relates to filing and display equipment and particularly to a novelty constructed clamping device for quickly and securely binding large sheets, such as drawings, blueprints, maps, samples, and the like, to suitable members for suspension from hanger arms.

The invention is primarily concerned with overcoming the difficulties frequently encountered in mounting such sheets or the like for suspension in a manner to permit their ready removal or the quick insertion of additional sheets.

It is, therefore, an object of the present invention to provide suspension members with novel means to clamp sheets for suspension therefrom.

Another object is to provide a resiliently flexible, easily adjusted, clamping element to bind sheets securely to a sheet suspension member.

Another object is to provide a novel clamp which is inexpensive to construct and positive in operation.

The foregoing and such other objects of the invention as will more fully appear hereinafter as the description proceeds, will be more readily understood from a perusal of the following description, in which reference is made to the accompanying drawing; wherein:

Fig. 1 is a fragmentary perspective view illustrating a mounted hanger arm and suspension member embodying features of the invention.

Fig. 2 is a vertical sectional view of the suspension member and clamp, showing parts in elevation.

Fig. 3 is a view taken substantially on line 3—3 of Fig. 2, showing the disengaged clamp in elevation.

The device of the present invention preferably is used in conjunction with filing equipment of a type illustrated and claimed in Kline Patent No. 1,867,158, issued July 12, 1932, although it is to be understood that the specific form of clamping element herein disclosed may readily be installed in other types of filing equipment. In carrying out the invention any suitable hanger arm may be detachably mounted upon a support.

As an example of a preferred type of hanger arm and mounting, the disclosure in Fig. 1 preferably includes a channel member 11 having aligned openings in the flanges thereof to receive a pin 12. The pin passes through a bearing portion 13 at one end of a suitable hanger in the form of a projecting arm 14. This arm may be formed from a strip of metal having a co-extensive track 15 welded or otherwise secured thereto adjacent its lower edge and spaced slightly therefrom. A sheet suspension member 16 may be formed of any suitable material, preferably sheet metal, so as to slidably engage the track 15 whereby it may readily be mounted on or drawn off the hanger arm.

As best shown in Fig. 2, the sheet suspension member 16 has its upper margin turned rearward and downwardly to define a longitudinal channel 17 for engaging over the upper edge of the track 15. Sheets 18, to be suspended from the suspension member 16, preferably have spaced apertures adjacent their upper edge to be threaded over similarly spaced studs 19 carried on the suspension member adjacent its lower edge. The studs 19 may be secured to the sheet suspension member in any approved manner, however, it is preferred that they be secured to said member by a nut 21.

When the desired number of sheets 18 are placed over the studs 19, said sheets must necessarily be clamped securely in place to prevent their tearing or otherwise becoming damaged in handling. Accordingly, novel clamping means necessarily is associated with each pin 19.

As best illustrated in Figs. 2 and 3, the stud 19 has a plurality of longitudinally spaced recesses in the form of diametrical openings 22 adapted to selectively receive a tongue 23 on a clamp plate or collar 24. The clamp plate 24 may be formed of any resiliently flexible material, preferably spring steel, and is cut out, as at 25, to freely admit the stud. Its two flat end portions 26 lie in a common plane and its intermediate connecting portions 27 are bowed outwardly of the plane of said end portions. When mounting the clamp in place over the sheets, the bowed portions 27 are disposed against the sheets and the clamp is pressed tightly thereagainst. When the sheets are compressed as tightly as possible on the stud 19, the clamp 24 then is shifted transversely of the stud to engage its tongue 23 in whichever opening 22 is closest thereto. This engagement prevents inadvertent displacement of the clamp and the sheets are tightly bound thereby against the suspension member 16. Obviously the sheets 18 are positively held on the studs and guarded against inadvertent tearing. To remove or add a sheet, the clamp 24 is initially moved transversely to disengage the tongue 23 and then outwardly off from the stud.

It should be understood that changes may be made in the detail structure of the embodiment disclosed herein, because the specific disclosure and description thereof is illustrative rather than restrictive, without departing from the spirit of the invention or the scope of the appended claims.

What is claimed is:

1. A clamp comprising a sheet of resiliently flexible material having a transversely bowed portion midway between its ends, said bowed portion having an aperture, and a tongue extending into said aperture from one end portion of said sheet, said tongue lying in the plane of said end portions.

2. A clamp comprising a sheet of resiliently flexible material having a transversely bowed portion midway between its ends, said bowed portion having an elongated aperture, and a tongue lying in the plane of said end portions extending into said aperture from one end and terminating substantially midway the length of said aperture.

3. In a filing unit, a suspension member having at least one sheet receiving stud, said stud having a plurality of diametrical openings uniformly spaced along its effective length, a resiliently flexible sheet retaining collar having an elongated aperture through which the stud extends, transversely bowed portions on said collar midway between its ends, said bowed portions being arched a distance substantially equal to the spacing between said stud openings, and a tongue lying in the plane of the end portions extending into said aperture from one end and terminating substantially midway the length of the said aperture.

ELMER L. ZWICKEL,
*Executor of the Estate of Daniel A. Brennan, Deceased.*